United States Patent [19]

Porter

[11] 4,155,433

[45] May 22, 1979

[54] STROKE-LIMITING STOP FOR POSITIONING DEVICE

[75] Inventor: Clyde R. Porter, Los Angeles, Calif.

[73] Assignee: P. L. Porter Company, Woodland Hills, Calif.

[21] Appl. No.: 839,200

[22] Filed: Oct. 4, 1977

[51] Int. Cl.² ............................................. F16F 9/32
[52] U.S. Cl. .............................. 188/300; 92/21 MR; 403/108
[58] Field of Search ......... 74/526; 92/18, 21, 21 MR; 188/67, 300; 403/108

[56] References Cited

U.S. PATENT DOCUMENTS

| 2,147,284 | 2/1939 | Doane | 403/108 X |
| 2,850,307 | 9/1958 | Kindl | 403/108 |
| 3,177,976 | 4/1965 | Wenzel | 74/526 X |
| 3,309,116 | 4/1967 | Johnson et al. | 403/108 |

Primary Examiner—Duane A. Reger
Attorney, Agent, or Firm—Smyth, Pavitt, Siegemund, Jones & Martella

[57] ABSTRACT

A stop member for limiting the range of adjustment provided by a positioning device. The positioning device is of the type wherein a piston is adjustable to various axial positions within a cylinder. The stop member has the form of a cup, coaxial with the cylinder and affixed to a portion of the piston rod which extends beyond the end of the cylinder, with the open end of the cup facing the cylinder. The diameter of the cup is sufficient to permit the end of the cylinder to advance into the cup as the piston is moved into the cylinder. The cylindrical wall of the cup is provided with axially-spaced slots. A stop element is inserted transversely to the axis through one of the slots and extends across the space within the cup to block the advancement of the cylinder into the cup, thereby limiting the relative movement of the cylinder with respect to the piston. In one embodiment, the stop element has a U-shape with its legs passing on opposite sides of the piston rod when the stop element is inserted. In another element, a collar around the cup retains two spaced bar-like stop elements which are urged into the slots in the cup.

19 Claims, 11 Drawing Figures

STROKE-LIMITING STOP FOR POSITIONING DEVICE

BACKGROUND OF THE INVENTION

1. Field of the Invention

The present invention is in the field of hydraulics and more specifically relates to hydraulic positioning devices of a locking type.

2. The Prior Art

The use of hydraulic locking devices for positioning adjustable apparatus is widespread. For example, hydraulic locking devices are used on aircraft seats to permit the tilt of the seat back to be adjusted at will. The hydraulic positioning device basically includes a closed cylinder filled with hydraulic fluid, within which a piston is selectively movable. Movement of the piston within the cylinder is enabled by manual actuation of a check valve which, in its normally closed position blocks the flow of hydraulic fluid from one side of the piston to the other side of the piston.

Although the hydraulic positioning device can be connected to the seat in a number of ways, it is usually connected so that as the seat back is tilted backward, the device is compressed, with the piston and piston rod being forced into the cylinder.

For logistic reasons it is desirable to use a single model of hydraulic locking device on all of the seats of an airplane. However, it may be desirable to limit the extent of the tilt of some of the seat backs to prevent them from locking emergency doors or hitting against bulkheads. Thus, there is a need for an adjustable stop which can be used selectively to set the maximum angle of tilt of the seat back. It is desirable that the stop be readily adjustable by authorized personnel, but otherwise tamperproof.

In a typical application, as the seat back is tilted backward, the hydraulic locking device is compressed. As typically mounted, the piston rod remains stationary and the cylinder advances over it.

It is known in the prior art to provide a fixed stop connected to the piston rod to limit the motion of the cylinder as it advances over the stationary piston rod. While such a stop is beneficial in preventing damage to the piston and the cylinder and in limiting the motion, it suffers from the disadvantage of not being readily adjustable.

In U.S. Pat. No. 3,177,980 issued Apr. 13, 1965 to P. L. Porter, there is disclosed a selectively adjustable stop for a hydraulic locking device. The stop includes a pin perpendicular to the axis of the device and affixed to the piston rod. The outer portions of the pin move axially in slots in an extended portion of the cylinder wall. Several slots of different lengths are provided and these are selectable by rotating the extension of the cylinder wall about the axis.

A stop providing a continuous range of adjustment is also known in the art. It includes a cup-like cap, affixed to the stationary piston rod with the open end of the cup disposed to receive the advancing cylinder. The cup-like cap is threaded on its inside cylindrical surface. A threaded stop member engages the threads of the cap and engages an axially-extending groove in the piston rod so that as the cap is rotated on the piston rod, the stop member, which does not rotate advances along the piston rod providing in effect an adjustable bottom in the cup-like cap for stopping the advancing cylinder. Although this type of stop is continuously adjustable, it is also easily tampered with. Further, it has proven expensive to produce since high-load-bearing acme threads are used inside the cap and because of the difficulty of machining the axially-extending groove in the normally threaded piston rod.

For the uses contemplated, such as the adjustment of seat back tilt, a continuous range of adjustment is not required. As will be seen below, the present invention provides a relatively less expensive stop selectively adjustable to any of several discrete positions.

SUMMARY OF THE INVENTION

In the present invention a hollow cylindrical cup is affixed to the stationary piston rod with the open end of the cup facing the cylinder, so that the advancing cylinder moves into the space within the cup. The extent to which the cylinder can advance into the cup is selectively limited by a stop element which extends transversely through the cup and through the space within the cup. In a preferred embodiment, a set of axially-spaced slots are provided through the wall of the cup, and the stop element is inserted into a selected slot.

In a first embodiment, two parallel slots extend transversely in opposite walls of the cup tangentially to its cylindrical surface. A U-shaped stop member is inserted into the slots in a transverse direction.

In a second embodiment, a single slot passes radially through both diametrically opposite walls of the cylindrical cup, and a U-shaped clip is inserted transversely to the axis. The U-shaped clip used in the first and second embodiments permits the piston rod to extend between the legs of the clip.

In third and fourth embodiments, the stop members are two parallel spaced bar-like elements. These stop elements take the place of the legs of the U-shaped stop element of the first and second embodiments. In the third and fourth embodiments, the bar-like stop element are held captive within a collar to prevent their loss, the collar fitting around the circumference of the cylindrical cup. Resilient means within the collar urge the stop elements together toward the axis and into the slots. In the third embodiment, the resilient means are springs. In the fourth embodiment, the resilient means is a portion of the collar itself, formed of an elastic substance such as rubber.

In all of the embodiments except the fourth, the cup and the stop element or collar are covered with a length of plastic tubing to discourage tampering and to keep out dust and debris.

In all of the embodiments, a set of axially-spaced slots are provided to define a corresponding set of seat back limit positions. The limit position is selected by inserting the stop element into a predetermined slot. It should be noted that once the limit position has been chosen, the seatback can be positioned at any tilt within a range from an upright position to the chosen maximum tilt position.

Although failure of the hydraulic portion of the seat positioner is extremely rare, should it occur and the aircraft must be used before the unit can be replaced, a safety feature of the present invention may be brought into play. In all of the embodiments, one set of slots defines an upright seat back position. When the stop element is inserted into this slot, the seat back can neither be raised or lowered. It cannot be raised because it is already at the position defined by maximum extension of the positioning device, and it cannot be lowered because of the blocking action of the stop element.

Therefore, when the stop element is inserted in this extreme slot, the positioning unit becomes a rigid member thereby preventing tilting of the seatback from its upright position.

The novel features which are believed to characterize the invention, both as to structure and method of operation, together with further advantages thereof, will be better understood from the following description considered in connection with the accompanying drawing in which several embodiments of the invention are illustrated by way of example.

DESCRIPTION OF THE PREFERRED EMBODIMENTS

Figure 1:
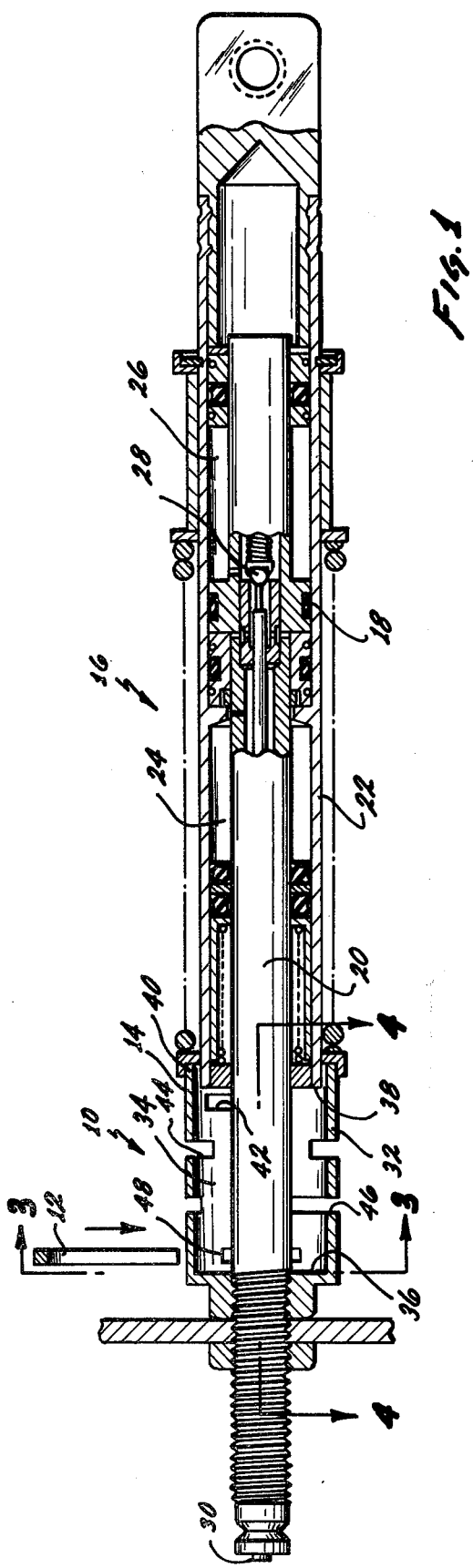
FIG. 1 is a cross-sectional view showing a first preferred embodiment of the present invention installed on a positioning device.
Figure 2:
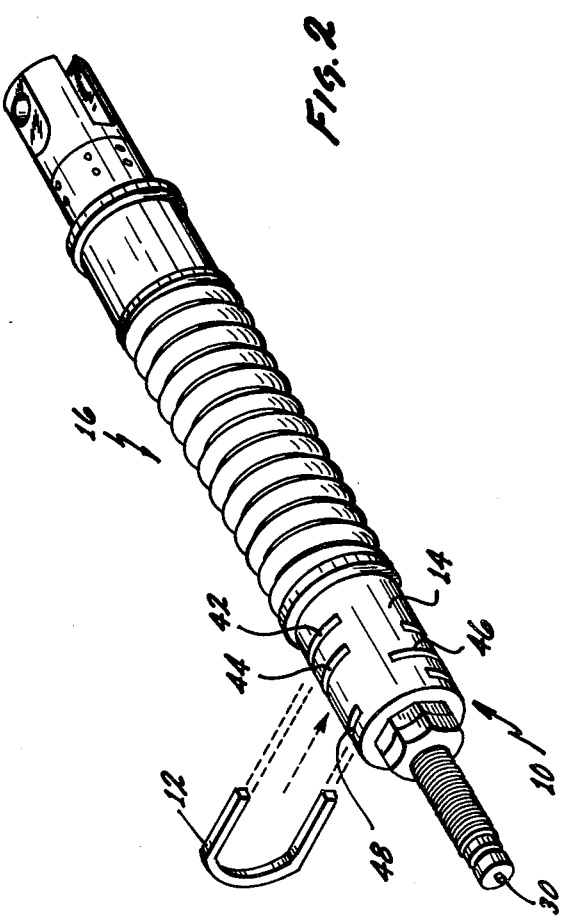
FIG. 2 is a perspective view of the first preferred embodiment of the present invention installed on a positioning device, and shows the manner in which the stop element is inserted into the cup portion of the present invention.

Turning now to the drawings, in which like parts are denoted by the same reference numerals throughout, there is shown in FIG. 1 a side cross-sectional view of the cup stop 10 of the present invention in a first preferred embodiment. The cup stop 10 includes a stop element 12 and a cup 14. As better seen in FIGS. 2 and 3, the stop element 12 can be inserted into the cup 14, through its side wall.

In FIG. 1, the cap stop of the present invention is shown attached to one end of a positioning device 16. The positioning device 16 includes a piston 18 attached to a piston rod 20 within a cylinder 22 the piston 18 divides the space within the cylinder 22 into two closed chambers 24, 26. The chambers 24, 26 are filled with a hydraulic fluid, and motion of the piston rod 20 with respect to the cylinder 22 cannot normally take place without a transfer of hydraulic fluid from one of the closed chambers 24, 26 to the other. The transfer of fluid is controlled by a check valve 28 actuated by a control wire 30, which extends within the piston rod 20.

The present invention restricts the normal operation of the positioning device 16 only in that the present invention provides means for limiting the extent of the motion. The positioning device 16 may be adjusted to have any desired length greater than the minimum length established by the cup stop 10 of the present invention.

The cup 14 includes a wall 32 which defines a generally cylindrical space 34 within the cup. The cup 14 further includes a closed end 36 which is affixed to a portion of the piston rod 20 which extends beyond the end 38 of the cylinder 22. The open end 40 of the cup 14 faces the cylinder 22 and has an inside diameter sufficiently large to permit the end 38 of the cylinder to extend into the cup 14, so that as the cylinder 22 moves to the left in FIG. 1, the end 38 of the cylinder 22 advances into cup 14.

The advancing motion of the end 38 of the cylinder 22 into the cup 14 is, at some point, blocked by the stop element 12 when it has been inserted into one of the several slots extending through the wall 32 of the cup 14.

The cup 14 is provided with several slots 42-48, which extend through the cup along straight lines lying in planes perpendicular to the axis. When the stop element 12 has been inserted into one of the slots, it is held so as to extend across the space 34 within the cup, so as to block the advancing motion of the end 38 of the cylinder 22. In the embodiment shown in FIGS. 1-4, at each axial position two parallel slots extend transversely in opposite walls of the cup tangentially to its cylindrical surface. This can best be seen in FIG. 3, wherein the slots are designated as 48' and 48''. In the embodiment of FIGS. 1-4, the central portion of the U-shaped stop element 12 lies radially outwardly from the surface 14.

Figure 3:
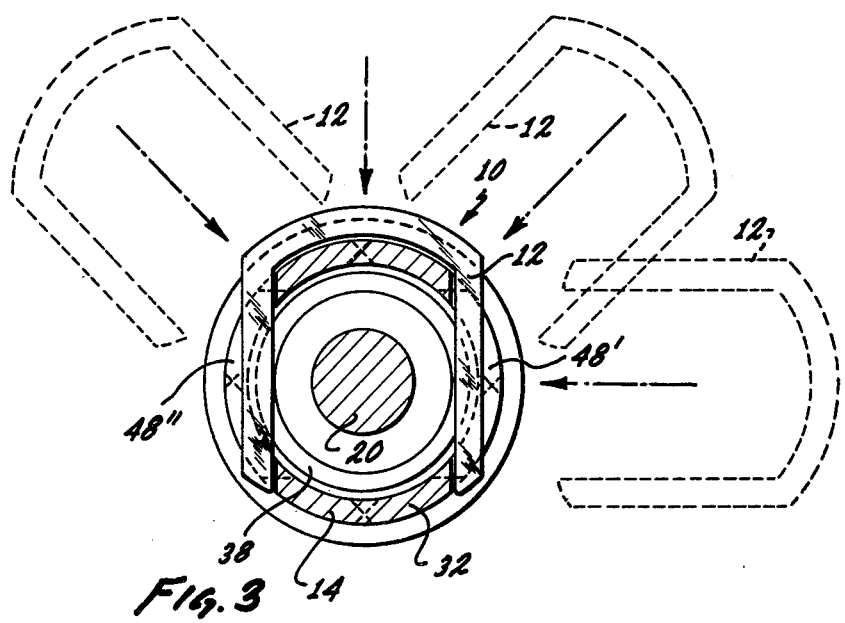
FIG. 3 is a cross-sectional view in a plane perpendicular to the axis of the direction indicated by the lines 3—3 of FIG. 2, and showing the first preferred embodiment of the present invention.
Figure 4:
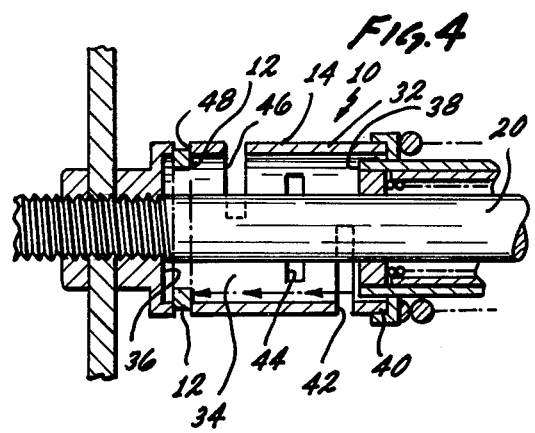
FIG. 4 is a cross-sectional view in a plane including the axis and showing the first preferred embodiment of the present invention.
Figure 5:
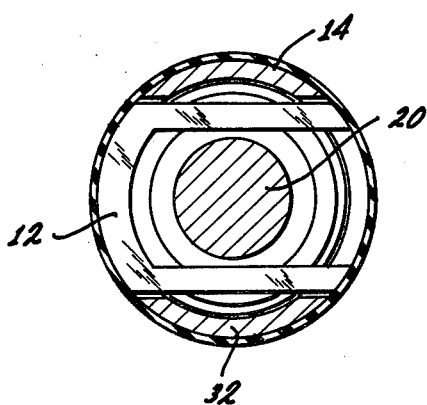
FIG. 5 is a cross-sectional view in a plane perpendicular to the axis in the direction indicated by the lines 5—5 of FIG. 4 and showing a second preferred embodiment of the present invention.

In a second embodiment shown in FIG. 5, at each axial slot position a single slot passes through diametrically opposite walls of the cylindrical cup, and a U-shaped stop element is inserted transversely to the axis. The legs of the stop element extend through the generally cylindrical space within the cup 14 on opposite sides of the piston rod 20. In this second preferred embodiment, the central portion of the stop element 12 can be inserted to a position within the outline of the cylindrical surface of the cup 14, as may best be seen by comparing FIGS. 3 and 5. It can be seen that the difference between the first and second preferred embodiments is mainly a matter of the size of the stop element 12 and how it is inserted. A careful comparison of the portions of the wall 32 which define the slots in FIGS. 3 and 5 shows that those portions differ only in a relatively small region which lies adjacent the stop element 12 in its fully inserted position.

As shown in position 2 and position 3, the slots located at different axial position are skewed with respect to one another, and this helps to avoid confusion. As shown in FIG. 3, depending on the axial position selected, the stop element 12 will be inserted in different directions.

Figure 6:
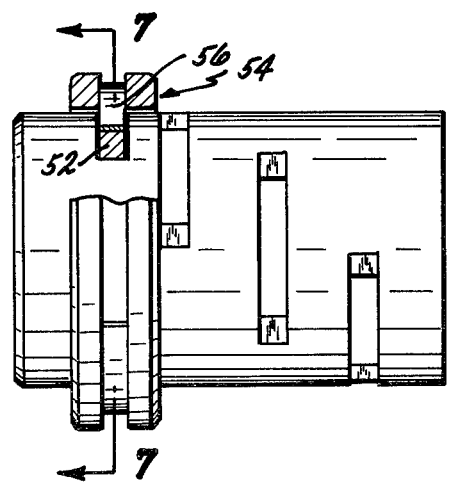
FIG. 6 is a side view of a third preferred embodiment of the present invention.
Figure 7:
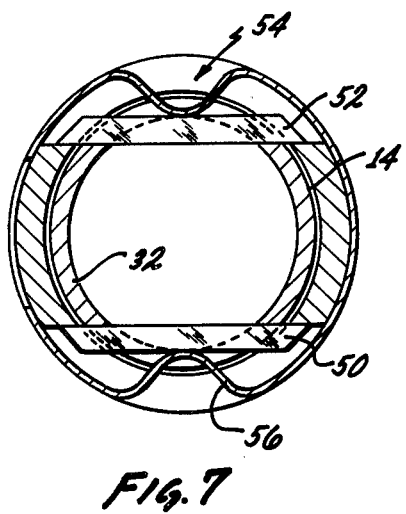
FIG. 7 is a cross-sectional view in a plane perpendicular to the axis in the direction indicated by the lines 7—7 of FIG. 6 and showing a third preferred embodiment in which the collar has been rotated so that the stop elements are seated within the slots of the cup.
Figure 8:
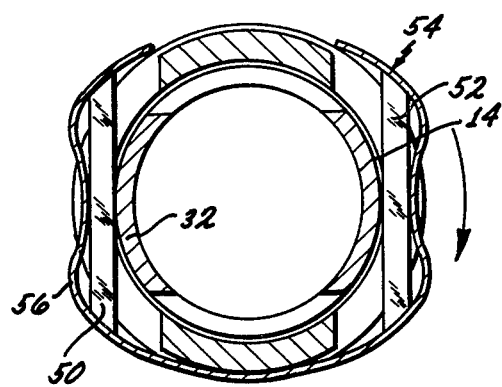
FIG. 8 is a cross-sectional view in a plane perpendicular to the axis in the direction indicated by the lines 7—7 of FIG. 6 and showing the third preferred embodiment of the present invention in which the collar has been rotated for adjustment, unseating the stop elements from the slots in the cup.

In the third preferred embodiment shown in FIGS. 6-8, the arrangement of the slots 42-48 on the cup 14 remains the same as in the first preferred embodiment. But the U-shaped stop element 12 is replaced by two bar-like parallel stop elements 50, 52 as shown in FIGS. 7, 8, 10, and 11.

In the third preferred embodiment shown in FIGS. 6, 7, and 8, the stop elements 50, 52 are held captive within a collar 54 to prevent them from becoming lost. It is best seen in FIGS. 7 and 8, the collar 54 includes a spring 56 which urges the stop elements 50, 52 into the slots of the cup. FIG. 7 shows the stop elements seated in the slots.

If it is desired to alter the limiting position, the collar is rotated about the axis causing the stop elements to ride up onto the cylindrical surface of the cup 14 as shown in FIG. 8. In this position, because the stop elements no longer engage the slots, the collar may be slid axially to an axial position coincident with the desired slot. The stop elements are then caused to seat in the desired slots by rotation of the collar about the axis.

Figure 9:
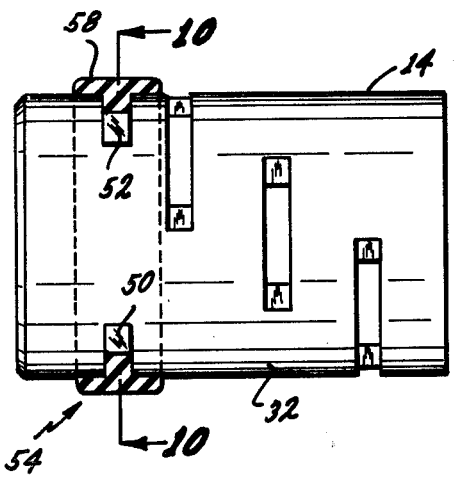
FIG. 9 is a side view of a fourth preferred embodiment of the present invention in which the collar is shown in cross section.
Figure 10:
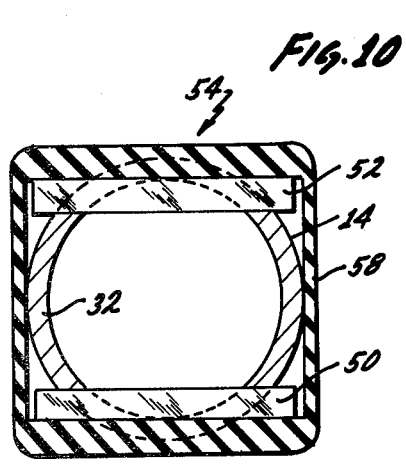
FIG. 10 is a cross-sectional view in a plane perpendicular to the axis in the direction indicated by the lines 10—10 of FIG. 9 and showing the fourth preferred embodiment with the collar rotated to seat the stop elements within the slots of the cup; and, FIG. 11 is a cross-sectional view in a plane perpendicular to the axis in the direction 10—10 of FIG. 9 and showing the fourth preferred embodiment with the collar rotated for adjustment, unseating the stop elements.
Figure 11:
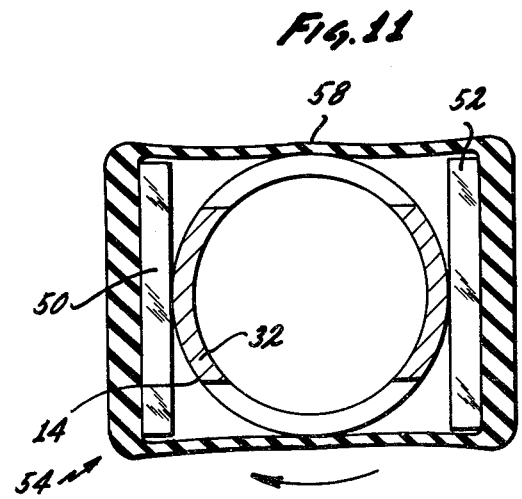

FIGS. 9, 10, and 11 relate to a fourth preferred embodiment of the present invention in which the collar 54 includes a resilient portion 58 which normally urges the stop elements 50, 52 inwardly toward the axis so that they are normally maintained in a seated position in a chosen set of slots in the cup 14 as shown in FIG. 10.

When it is desired to alter the limit position, the collar 54 is rotated with respect to the cup 14 so that the stop elements 50, 52 are spread apart by the cylindrical surface of the cup 14 against the urging of the resilient portion 58. After 90° of rotation, the collar has been stretched from the seated position shown in FIG. 10 to the position shown in FIG. 11. As shown in FIG. 11, the stop elements 50, 52 bear against the cylindrical surface of the cup 14 and therefore the collar 54 may be slid axially to bring it into coincidence with the axial location of another set of slots. At that position, rotation of the collar with respect to the cup permits the stop elements 50, 52 to be pushed into the slots by the force of the resilient portion 58. Like the third preferred embodiment shown in FIGS. 6, 7, and 8, the fourth preferred embodiment of FIGS. 9, 10, and 11 has the advantages of preventing loss of the stop elements 50, 52 and of providing an easy means of altering the limiting position.

In any of the four embodiments, one set of slots such as shown at 42 in FIG. 1 may be positioned adjacent the end 38 of the cylinder 22 when the piston rod 20 is at its maximum possible extension out of the cylinder 22. In a typical application, this position of the slot 42 corresponds to the upright seat back position, so that when the stop element is inserted in the slot 42, the back of the seat will be held positively in the upright position. With the stop element inserted in the slot 42, the seat back can neither be raised nor lowered from the upright position. It cannot be raised because it is already at the position defined by the maximum extension of the positioning device 16, and it cannot be lowered because of the blocking action of the stop element inserted in the slot 42. As long as the stop element remains inserted in the slot 42, the positioning device cannot be altered and it behaves as if it were a single rigid member. It must be remembered that when the stop element is inserted in one of the other slots 44, 46, the positioning device 16 of FIG. 1 can be altered to any desired position within a range with the stop element defining only the end point of the range of adjustment.

Thus, there has been described a cup stop for use with a positioning device to provide an alterable limit on the range of positions to which the positioning device can be adjusted. Four preferred embodiments of the device have been shown and described in detail and it is recognized that numerous variations and improvements would be obvious to one skilled in the art. These additional variations and improvements are regarded as being within the spirit and scope of the present invention, which is limited only by the appended claims.

What is claimed is:

1. A cup stop to limit axial motion of a piston rod into one end of a cylinder, comprising:
    a cup having a wall defining a generally cylindrical space within said cup, disposed coaxially with the piston rod, having a closed end affixed to a portion of the piston rod extending beyond the end of the cylinder, having an open end disposed toward the cylinder, the open end having an inside diameter sufficient to permit the end of the cylinder to extend into said cup, and having a slot extending through said cup along a straight line lying in a plane normal to the axis; and,
    a stop element of such size and shape as to permit portions of it to be inserted into the slot and to extend across the cylindrical space when inserted, so as to limit the extent to which the end of the cylinder can extend into said cup.

2. The cup stop of claim 1 wherein said cup further comprises two slots extending through said cup along two parallel straight lines lying in the same plane normal to the axis, and wherein said stop element includes portions which can be inserted simultaneously into the two slots.

3. The cup stop of claim 2 wherein said stop element is U-shaped.

4. The cup stop of claim 2 wherein said two slots are disposed symmetrically about the axis.

5. The cup stop of claim 1 wherein said cup has more than one slot extending through it along straight lines lying in axially spaced planes normal to the axis, and wherein said stop element is of such size and shape as to permit portions of it to be inserted selectively into a chosen one of the slots;
    whereby, the extent to which the cylinder can extend into said cup can be chosen.

6. The cup stop of claim 5 wherein said straight lines lying in axially spaced planes normal to the axis are skewed with respect to one another.

7. The cup stop of claim 5 wherein one of said slots is located along the axis at such a location as to prevent any motion of the piston rod into the cylinder from a position of maximum extension;
    whereby, all motion of the piston rod with respect to the cylinder is prevented by mechanical means.

8. A cup stop to limit axial motion of a piston rod into one end of a cylinder, comprising:
    a cup having a wall defining a generally cylindrical space within said cup, disposed coaxially with the piston rod, having a closed end affixed to a portion of the piston rod extending beyond the end of the cylinder, having an open end disposed toward the cylinder, the open end having an inside diameter sufficient to permit the end of the cylinder to extend into said cup, and having more than one slot extending through it along straight lines lying in axially spaced planes normal to the axis;

a stop element of such size and shape as to permit portions of it to be inserted selectively into a chosen one of the slots so as to extend across the cylindrical space when inserted to limit the extent to which the end of the cylinder can extend into said cup; and a collar encircling said cup, axially slidable and slidably rotatable about the axis on the outside surface of said cup, for retaining said stop element and carrying it to a position for insertion into the chosen one of the slots.

9. The cup stop of claim 8 wherein said collar further comprises resilient means for urging said stop element into the chosen slot.

10. The cup stop of claim 9 wherein said resilient means is a spring.

11. The cup stop of claim 9 wherein said resilient means is a rubber portion of said collar.

12. A cup stop to limit axial motion of a piston rod into one end of a cylinder, comprising:

a cup having a wall defining a generally cylindrical space within said cup, disposed coaxially with the piston rod, having a closed end affixed to a portion of the piston rod extending beyond the end of the cylinder, having an open end disposed toward the cylinder, the open end having an inside diameter sufficient to permit the end of the cylinder to extend into said cup, and having a slot extending through said cup along a straight line lying in a plane normal to the axis;

a stop element of such size and shape as to permit portions of it to be inserted into the slot and to extend across the cylindrical space when inserted, so as to limit the extent to which the end of the cylinder can extend into said cup; and, a collar slidably rotatable on the outside of said cup about the axis for retaining said stop element and carrying it to a position for insertion into the slot.

13. The cup stop of claim 12 wherein said collar further comprises resilient means for urging said stop element into the slot.

14. The cup stop of claim 13 wherein said resilient means is a spring.

15. The cup stop of claim 13 wherein said resilient means is a rubber portion of said collar.

16. A cup stop to limit axial motion of a piston rod into one end of a cylinder, comprising:

a cup having a wall defining a generally cylindrical space within said cup, disposed coaxially with the piston rod, having a closed end affixed to a portion of the piston rod extending beyond the end of the cylinder, having an open end disposed toward the cylinder, the open end having an inside diameter sufficient to permit the end of the cylinder to extend into said cup, and having more than one slot extending through it along straight lines lying in axially spaced planes normal to the axis;

a stop element of such size and shape as to permit portions of it to be inserted selectively into a chosen one of the slots so as to extend across the cylindrical space when inserted, so as to limit the extent to which the end of the cylinder can extend into said cup; and, a collar encircling said cup, axially slidable and slidably rotatable about the axis on the outside surface of said cup, retaining said stop element and carrying it to a position for insertion into the chosen one of the slots and including resilient means for urging said stop element into the chosen slot.

17. The cup stop of claim 16 wherein said collar further comprises resilient means for urging said stop element into the chosen slot.

18. The cup stop of claim 17 wherein said resilient means is a spring.

19. The cup stop of claim 17 wherein said resilient means is a rubber portion of said collar.

* * * * *